US012129979B2

United States Patent
Trundle et al.

(10) Patent No.: US 12,129,979 B2
(45) Date of Patent: Oct. 29, 2024

(54) FLEXIBLE LIGHTING STRIPS

(71) Applicant: STG AEROSPACE LIMITED, Cwmbran (GB)

(72) Inventors: Robert Michael Freeman Trundle, Cwnbran (GB); Andreas Pitsimakis, Cwnbran (GB); Marc John Sugrue, Cwnbran (GB)

(73) Assignee: STG AEROSPACE LIMITED, Cwmbran (GB)

( * ) Notice: Subject to any disclaimer, the term of this patent is extended or adjusted under 35 U.S.C. 154(b) by 0 days.

(21) Appl. No.: 18/330,938

(22) Filed: Jun. 7, 2023

(65) Prior Publication Data
US 2023/0400161 A1     Dec. 14, 2023

(30) Foreign Application Priority Data

Jun. 30, 2022 (GB) ....................................... 2209596
Jun. 2, 2023 (GB) ....................................... 2308237

(51) Int. Cl.
*F21S 4/22* (2016.01)
*B64D 11/00* (2006.01)
*F21S 4/24* (2016.01)

(52) U.S. Cl.
CPC ............ *F21S 4/22* (2016.01); *B64D 11/00* (2013.01); *F21S 4/24* (2016.01); *B64D 2011/0038* (2013.01)

(58) Field of Classification Search
CPC ............ F21S 4/22; F21S 4/24; B64D 11/00
See application file for complete search history.

(56) References Cited

U.S. PATENT DOCUMENTS 5,193,895 A * 3/1993 Naruke ................. B60Q 1/304
362/800
8,179,037 B2 * 5/2012 Chan .................... F21V 15/013
362/249.02

(Continued)

FOREIGN PATENT DOCUMENTS

CN          2677740 Y     2/2005
CN        207246869 U     4/2018
(Continued)

OTHER PUBLICATIONS

UK Search Report issued in connection with UK Appl. Ser. No. 2209596.2 dated Dec. 13, 2022.

*Primary Examiner* — Evan P Dzierzynski
*Assistant Examiner* — Nathaniel J Lee
(74) *Attorney, Agent, or Firm* — FOLEY & LARDNER LLP

(57) ABSTRACT

A flexible lighting strip for use in an aircraft cabin has a minimum bend radius of no more than 40 mm, and comprises: a track comprising a channel extending along the length of the track; and an inner component within the channel, the inner component comprising lighting components arranged along the length of the inner component. The track comprises two inwardly-directed protrusions extending from opposing sides of the channel, each of the protrusions extending into the inner component 4 and increasing in width within the inner component. The inner component may be formed separately as an insertable insert, or may be formed within the track. A kit of parts for forming such a flexible lighting strip is also disclosed.

20 Claims, 6 Drawing Sheets

(56) References Cited

U.S. PATENT DOCUMENTS

| | | | |
|---|---|---|---|
| 9,072,171 B2* | 6/2015 | Simon | F21V 19/005 |
| 9,725,033 B1* | 8/2017 | Johannessen | B60Q 3/80 |
| 2013/0175556 A1* | 7/2013 | Ray | F21K 9/232 |
| | | | 257/88 |

FOREIGN PATENT DOCUMENTS

| | | |
|---|---|---|
| CN | 211289662 U | 8/2020 |
| CN | 216556635 U | 5/2022 |
| DE | 20 2015 101 755 U1 | 5/2015 |
| WO | WO-00/19565 A2 | 4/2000 |

\* cited by examiner

FLEXIBLE LIGHTING STRIPS

CROSS-REFERENCE TO RELATED PATENT APPLICATIONS

The present application claims priority to and the benefit of the following three applications, the disclosure of each of which, including the specification, drawings, claims, and abstract is incorporated herein by reference in its entirety for all purposes: Grecian (GR) Patent Application No. 20220100487, filed Jun. 10, 2022; United Kingdom (GB) Patent Application No. 2209596.2, filed Jun. 30, 2022; and United Kingdom (GB) Patent Application No. 2308237.3 field Jun. 2, 2023.

BACKGROUND

The present invention relates to a flexible lighting strip—in particular comprising electric lights such as light-emitting diodes (LEDs) and/or photoluminescent materials—which is able to be rolled more tightly than prior lighting strips without breaking or splitting, and which is suitable for use on board an aircraft.

Such a flexible lighting strip may have particular utility in an aircraft cabin, and in particular in monuments within the cabin and for Accent Lighting (i.e. lighting edges, corners, or normally darker areas, and for highlighting or accenting features). It will be appreciated that such flexible lighting strips could also be used for floor-path marking, to guide passengers to aircraft exits, and/or for main cabin lighting. Currently, main aircraft cabin lighting is generally provided by fixed, rigid, and straight bars of lights (generally light-emitting diodes in modern or modernized cabins), so being able to use flexible cabin lighting may allow for a significant change in the internal structure, styling, and aesthetics of the cabin interior.

SUMMARY

An exemplary embodiment relates to a flexible lighting strip for use in an aircraft cabin, the flexible lighting strip having a minimum bend radius of no more than 40 mm. The flexible lighting strip includes a track having a channel extending along the length of the track, and an inner component within the channel, the inner component comprising lighting components arranged along the length of the inner component. The track includes two inwardly-directed protrusions extending from opposing sides of the channel, each of the protrusions extending into the inner component and increasing in width within the inner component.

Another exemplary embodiment relates to an aircraft cabin fixture that includes a flexible lighting strip for use in an aircraft cabin, the flexible lighting strip having a minimum bend radius of no more than 40 mm. The flexible lighting strip includes a track having a channel extending along the length of the track, and an inner component within the channel, the inner component comprising lighting components arranged along the length of the inner component. The track includes two inwardly-directed protrusions extending from opposing sides of the channel, each of the protrusions extending into the inner component and increasing in width within the inner component.

Another exemplary embodiment includes a kit of parts for forming a flexible lighting strip, the kit of parts including a track comprising a channel extending along the length of the track and two inwardly-directed protrusions extending along opposing sides of the channel, each of the protrusions extending into the channel and widening within the channel. The kit of parts also includes an elongate insert, the insert comprising lighting components arranged along the length of the insert and two inwardly-directed indentations extending along opposing sides of the insert. The insert is insertable into the channel of the track, the indentations being sized and shaped to receive the protrusions of the track therein.

BRIEF DESCRIPTION OF THE DRAWINGS

There now follows, by way of example only, a detailed description of embodiments of the present invention with reference to the accompanying drawings in which.

DETAILED DESCRIPTION

Figure 1:
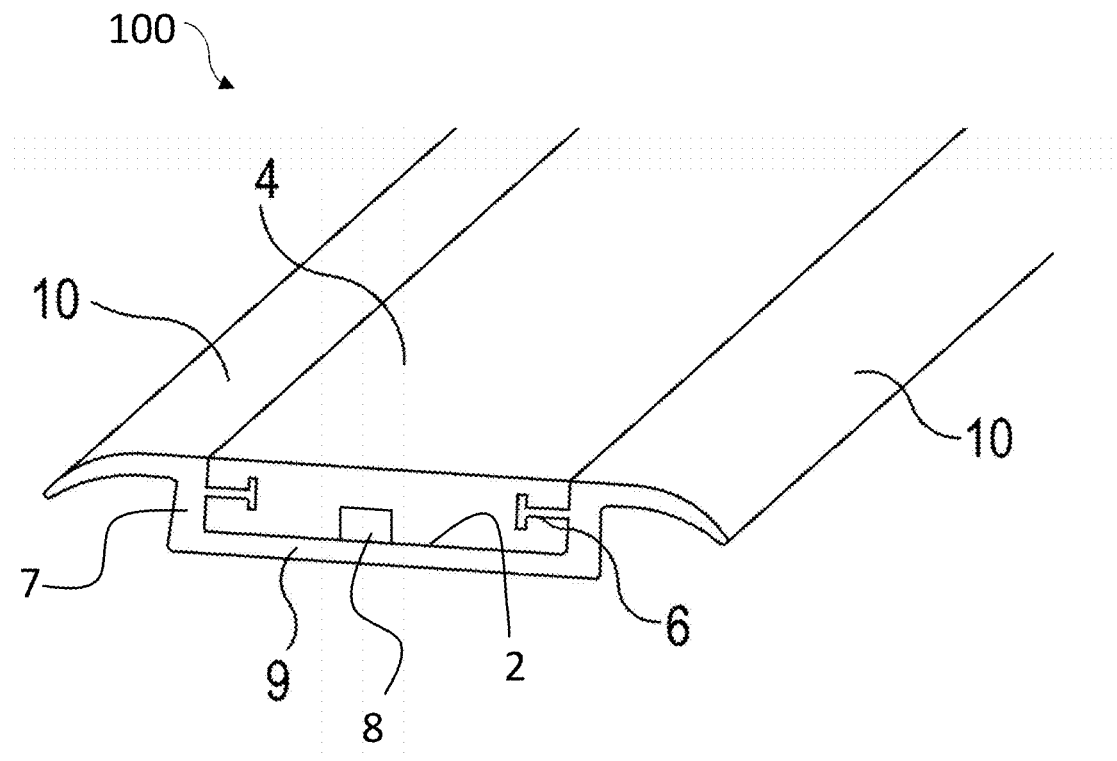
FIG. 1 is a perspective view of a first flexible lighting strip.

As used herein, "monuments" are structures or sectioned-off defined areas within the aircraft cabin/customer-facing parts of the aircraft interior, which are generally removable (so not necessary for structural integrity or other functionality of the aircraft). Monuments may therefore include seats (in particular first class and business class seats that fold into beds), drinks bars, function areas, and galleys.

According to a first aspect, there is provided a flexible lighting strip for use in an aircraft cabin, the flexible lighting strip having a minimum bend radius of no more than 40 mm (i.e. a bend radius of less than or equal to 40 mm). A flexible lighting strip according to the first aspect therefore will not break, or otherwise permanently deform, if bent to a radius of 40 mm, and may be able to be bent more tightly without breaking. The flexible lighting strip comprises: a track comprising a channel extending along the length of the track; and an inner component within the channel, the inner component comprising lighting components arranged along the length of the inner component.

The track comprises two inwardly-directed protrusions extending from opposing sides of the channel, each of the protrusions extending into the inner component and increasing in width within the inner component. The protrusions may therefore extend towards each other, and may be described as facing each other.

The protrusions may be parallel to each other. The protrusions may be mirror images of each other, around a mirror plane extending vertically from a center line of the base of the track.

The protrusions may extend along the opposing sides of the channel—optionally along the full channel length. Alternatively or additionally, a series of discrete protrusions may be provided along the length of the channel.

The interactions of the protrusions of the track with the inner component may be sufficient to hold the inner component in place within the track without any need for an adhesive, welding, or other join, which may improve flexibility as compared to prior art lighting strips.

Bend radius, which is measured to the inside curvature of the strip, is defined as the minimum radius to which one can bend a strip without kinking it, damaging it, or shortening its life. The smaller the bend radius, the greater is the material's flexibility. It will be appreciated that the lighting strips described herein are therefore more flexible than lighting strips used in aircraft to date, which are often rigid or only minimally flexible, and which would break if bent to a radius of 40-50 mm, often by a housing splitting or buckling and coming away from a component containing the lights. The bend radius of the strip may also be referred to as the "minimum bend radius" or "minimum bending radius". The interactions of the protrusions of the track with the inner component may facilitate some relative movement without damage, so facilitating this tighter bend radius.

The flexible lighting strip may have a minimum bend radius of less than or equal to 30 mm.

The flexible lighting strip may have a minimum bend radius of greater than or equal to 10 mm; i.e. it may break, or otherwise permanently deform, if bent to a radius of less than 10 mm.

The flexible lighting strip may have a minimum bend radius of greater than or equal to 30 mm.

The protrusions may be T-shaped, L-shaped, or Y-shaped in cross-section, the cross-section being taken perpendicular to track length. For example, the protrusions may each be L-shaped in cross-section, with a first portion extending away from the track side wall and a second portion extending upwardly from the first portion, optionally at an angle of 90°. The second portion may extend downwardly instead of upwardly in other examples.

The protrusions may have a constant cross-sectional shape along the length of the track.

The lighting components may be or comprise light-emitting diodes (LEDs).

The lighting components (e.g. LEDs) may therefore lie within the inner component, being completely surrounded by a material of the inner component (except in a region of a connector/base in various embodiments). The inner component may therefore closely surround the individual lighting elements in such embodiments—for example with a gap of less than 2 mm, 1 mm, or 0.5 mm, and optionally no gap at all, between the inner component and each lighting element. All light emitted by the LEDs (and/or other lighting components) therefore passes through the inner component in these embodiments.

The inner component may fully envelop the lighting components. The lighting components may be enveloped/encapsulated by the inner component.

In some embodiments, the inner component may be in contact with the surface of each lighting component over at least the majority of its surface area—for example, an inner component formed from a soft potting material may fill all crevices around each lighting component and leave no air gap, whereas an inner component formed from a harder potting material may leave a few crevices—for example gaps of around 200-300 nm—unfilled, so leaving a gap (which may be air-filled) or void adjacent the lighting element. The materials may be selected such that the inner component does not adhere to the lighting component's surface.

In other embodiments, a gap—e.g. an air gap or void—may surround the lighting element, for example forming a gap of no more than 2 mm, and optionally of no more than 1 mm, or 0.5 mm (and in some cases, of less than 500 nm, and optionally less than 200-300 nm) between the lighting component and the inner component.

In some embodiments, a coating may be applied to the lighting components. The inner component may contact the coating.

The lighting components may be arranged within a lower portion of the inner component. The upper face of the inner component may be exposed, whilst the lower and side faces of the inner component are contained within the track. The inner component may therefore serve to shield/protect and cover the lighting components.

The lighting components, like the inner component, may be contained within the track.

The inner component (and in particular the bulk material of the inner component) may be an at least substantially continuous solid, having no significant air gaps, voids, or porosity.

The inner component may be at least substantially the same length as the track, and may extend continuously with the track. The inner component may be fully located within the track. In particular, whilst the upper surface of the inner component (in the orientation shown in various figures) is not covered by the track/is exposed, no part of the inner component may extend out of the track.

The lighting components may be fully located within the inner component, and thereby also fully located within the track. For example, whilst a base or connector of the lighting components (e.g. an LED board) may, in some embodiments, not be covered by the inner component/may be exposed, the base or connector may not extend beyond the base of the inner component (it may be level with the base of the inner component). In other embodiments, such a base or connector of the lighting components (e.g. an LED board) may be encapsulated within the inner component. The track may extend beneath a lower surface of the lighting components, ensuring that they are fully enclosed/covered by the inner component and track in conjunction, even if a lower surface of the lighting components is exposed level with or within a lower surface of the inner component.

The lighting components may be embedded within the inner component.

The inner component may be slidably insertable within the track, and may be described as an insert.

The protrusions may match such that the track has mirror symmetry along its length Each protrusion may extend into the channel by at least 10% of the channel's width, and optionally by at least 15% or 20% of the channel's width.

Each protrusion may have a first width and a second, largest width, wherein the second width is further within the inner component than the first width. The largest width may be greater than the first width by at least a factor of two, and optionally by at least a factor of 3 or 4. Each protrusion width may be measured perpendicular to the length of the flexible lighting strip and parallel to its height (i.e. perpendicular to track width).

Each protrusion may have a first width where it enters the inner component and a largest width within the inner component. The largest width may be greater than the first width by at least a factor of 1.5 or two, and optionally by at least a factor of 3 or 4.

The channel defined by the track may be at least substantially U-shaped in cross-section, having two sidewalls and one of the protrusions extending from each sidewall. The protrusions may extend generally towards each other.

The inner component may comprise an elastomer, or flexible polymer. The flexible polymer may form the majority of the inner component, and optionally may form all of the inner component except for the lighting components thereof. The flexible polymer may therefore be described as forming the body of the inner component. In some embodiments, the lighting components may be or comprise a photoluminescent material incorporated into the flexible polymer.

The inner component may comprise a potting material arranged to surround and encapsulate the lighting components. The potting material may form a majority of the volume of the inner component, and therefore may be described as a bulk material of the inner component (the lighting components may form the rest of the volume of the inner component). The potting material may be a transparent and aerospace-requirement compatible potting material. The potting material may protect the lighting components, and optionally may be an elastomer or flexible polymer. The potting material may be silicone or polyurethane. The potting material may be set solid for use.

The track may be made of an elastomer or flexible polymer, for example thermoplastic polyurethane (TPU).

The track may be open-topped such that an upper surface of the inner component is exposed in use. The inner component may therefore be contained within the track, but not fully enclosed by the track.

In some embodiments, the track may be made of the same material as the inner component.

The flexible lighting strip may have a cross-sectional shape/area perpendicular to its length with a width of less than 4 cm and optionally less than 3 cm, and a height of less than 2 cm, and optionally less than 1 cm.

The protrusions may have an at least substantially constant cross-sectional area and shape along the full length of the track.

The track, including the protrusions, may have an at least substantially constant cross-sectional area and shape along the full length of the track.

The track may be made by extrusion.

The protrusions may be formed integrally with the track.

The inner component may be a separable insert, e.g. a slidably-insertable insert arranged to be positioned within the track, or a pop-in insert arranged to be inserted into the channel of the track from above.

The inner component may be a slidably-insertable insert adapted to be positioned within the track by insertion from one end of the track.

The inner component may be a push-fit insert adapted to be positioned within the track by pushing into the channel of the track from above.

The inner component may be formed by at least partially filling the track with a potting material, and then curing or otherwise setting the potting material within the track. The inner component may therefore be formed in situ. The inner component may therefore fully encapsulate and closely surround lighting elements even when their shapes are complex and/or irregular.

The lighting components may be electrically controllable. The flexible lighting strip may further comprise a central Command Unit (CCU) arranged to control the lighting components. The CCU may be located outside of the track and may be connected to the lighting components of the inner component by one or more wires.

The inner component may not be bonded to the track. The track shape, and in particular the protrusions, may be the only features holding the inner component to the track.

The protrusions may curve and/or branch. The "width" of the protrusion may therefore be measured from an uppermost point on any branch or part of the protrusion to a lowermost point on any branch of the protrusion at the same position across the channel. For example, for an S-shaped protrusion, the protrusion may bend back on itself, so providing a maximum width between a lower tip of the "S" and a corresponding point on the upper curve of the "S" directly above the tip. Whilst the thickness of the material forming the protrusion may therefore be constant at any point along the curve of the S-shape, the protrusion's width is a function of its shape as well as the material thickness. This widening of the protrusion—be it through a thickening of the material or due to a curve, branch, or cross-bar, or a combination of multiple such features—may lock the inner component in place within the track. The material thickness may also increase within the inner component, in addition to the overall protrusion width (including any vertical spacing between sections of the protrusion) increasing.

The protrusions may have a step-change in width from a first width to a second width; the second width may be at least 1.5 times the first width. The step may be arranged to lie within the inner component in use.

Each protrusion may have a maximum width of less than or equal to 50% of the insert's height.

Each protrusion may extend from the track at a position at least approximately central to an adjacent side of the inner component (e.g. at a half-way point vertically).

The track may be at least substantially U-shaped in cross-section, so providing a channel along the length of the track. The inner component may be sized to at least substantially fill the channel in the track. The inner component may be sized to be level with, or slightly beneath, the top of the channel such that the strip is at least substantially rectangular in cross-section. The inner component may be sized to not protrude from the channel/above the sidewalls of the track.

The sidewalls of the track may be thinner above the protrusion than below the protrusion, optionally by up to 50%.

According to a second aspect, there is provided an aircraft cabin fixture comprising a flexible lighting strip as described with respect to the first aspect, the flexible lighting strip extending along an edge of the aircraft cabin fixture.

According to a third aspect, there is provided a kit of parts for forming a flexible lighting strip, the kit of parts comprising: a track comprising a channel extending along the length of the track and two inwardly-directed protrusions extending along opposing sides of the channel, each of the protrusions extending into the channel and widening within the channel; and an elongate insert, the insert comprising lighting components arranged along the length of the insert and two inwardly-directed indentations extending along opposing sides of the insert.

The insert is insertable into the channel of the track, the indentations being sized and shaped to receive the protrusions of the track therein.

The interaction between the indentations and the protrusions may hold the insert in place within the track, even when the flexible lighting strip is bent or rolled.

The insert may be slidably insertable into the track from one end of the track.

The insert may be insertable into the track from above, being pushed into the open channel.

The skilled person would understand that features described with respect to one aspect of the invention may be applied, mutatis mutandis, to the other aspect of the invention.

In the Figures, like reference numerals are used for like or corresponding features.

FIG. 1 shows a perspective view of a flexible lighting strip 100 for use in an aircraft cabin. The lighting strip 100 of FIG. 1 is intended for use as a floor-path marking, but it will be appreciated that this is an example only and in no way limiting to the scope of this disclosure.

The flexible lighting strip 100 comprises a track 9. The track 9 is elongate, in that it has a length significantly larger than its width or height. For example, the track length may be at least 1 m or 2 m, whereas the cross-section of the track 9 may be no more than 1 cm by 3 cm.

In various embodiments, the track 9 may have a width of less than 4 cm and optionally less than 3 cm, and a height of less than 2 cm, and optionally less than 1 cm.

The track 9 has a channel 2 extending along its length. In the embodiment being described, the channel 2 extends the full length of the track 9 and has a constant cross-sectional shape along the full length of the track 9. The channel 2 is a part of the shape of the track 9, in particular the U-shaped inner surface, and is labelled separately for ease of description only.

In the embodiment shown, the channel 2 is U-shaped, being provided by a U-shaped internal cross-section of the track 9. The channel 2 therefore has a base and two sidewalls 7. The internal corners between the base and sidewalls 7 may be sharp or curved. In the embodiment shown, the sidewalls 7 are at least substantially perpendicular to the base and at least substantially parallel to each other. The sidewalls 7 of the embodiment shown in FIG. 1 are parallel to each other across their full heights. In other embodiments, the sidewalls may be angled outward, so providing a more V-shaped channel shape (although a flat base may still be provided rather than the sidewalls meeting at a point), or may be angled inwards, towards each other, such that the channel narrows towards its opening, or may vary in angle or curvature along their heights, as described in more detail below with respect to FIGS. 6 and 7.

In the embodiments shown, the base is wider than the channel 2 is tall, so providing a rectangular cross-section for the track 9.

In some embodiments, such as those described below with respect to FIG. 2, the track 9 may have a complete U-shaped cross-section; both internal and external. However, in some embodiments, including that shown in FIG. 1, the track 9 may have a more complex shape.

The track 9 of FIG. 1 has a pair of "wings" 10 extending outwardly from an upper region of the track, one on each side of the channel 2. The wings 10 narrow and curve downwardly at their extremities and may, in use, overlie carpet or another aircraft cabin floor covering. The wings 10 may serve to reduce a potential trip hazard at the edges of the track 9. The wings 10 may be flexible to conform to a floor shape. In other embodiments, no wings may be present. Additionally or alternatively, differently-shaped protrusions from the track 9 may be provided, for example to provide fittings or connectors dependent on an intended mounting style and location of the flexible lighting strip 100.

For ease of description, the longest dimension of the strip 100/track 9/channel 2 is described as its length. The vertical dimension (in the orientation shown) is described as its height, and the horizontal dimension (in the orientation shown) is described as its width. The width of the channel 2 is therefore the dimension of the base of the U-shaped channel 2 between the sidewalls 7, with the width of the track 9 being wider in that it includes wall width (and optionally the width of wings 10 or other extensions from the track). The height of the channel 2 is the extent of the sidewalls 7 of the U-shape away from the base, with the height of the track being slightly larger in that it includes the base thickness.

The track 9 further comprises a pair of inwardly-directed protrusions 6. The protrusions 6 of the embodiment shown in FIG. 1 have a T-shaped cross-section, with the stem of the T extending from the sidewall 7 and a cross-bar of the T at the end of the stem being located above the base of the channel 2, spaced from the sidewall 7 by the stem. The protrusions 6 of the embodiment shown in FIG. 1 have a constant cross-section extending along the full length of the channel 2, and may therefore be described as "T-bar" protrusions, as they provide bars running along the length of the track 9, as can be seen most clearly in FIG. 4.

In the embodiment shown, the protrusions 6 match such that the track 9 has a plane of mirror symmetry running along its length, along the center of the channel 2. In other embodiments, the protrusions 6 may not be symmetrical—indeed, differently shaped, sized, and/or positioned protrusions may be used instead of a matched pair.

The protrusions 6 extend towards each other, across the track 9/along the width of the track 9.

In other embodiments, a series of individual protrusions 6 may be provided along the length of the channel 2 rather than the individual protrusions 6 having a significant extent along the length of the track 9. However, it will be appreciated that having a continuous protrusion may facilitate correct insertion of a slidable insert 4 as described below, in embodiments in which the inner component 4 takes the form of an insert 4 arranged to be inserted into the track 9.

In the embodiment being described, the protrusions 6 extend from the sidewalls 7 of the channel 2 at a position just above halfway up the height of the sidewalls from the channel base. In other embodiments, they may be placed higher or lower.

Figure 6:
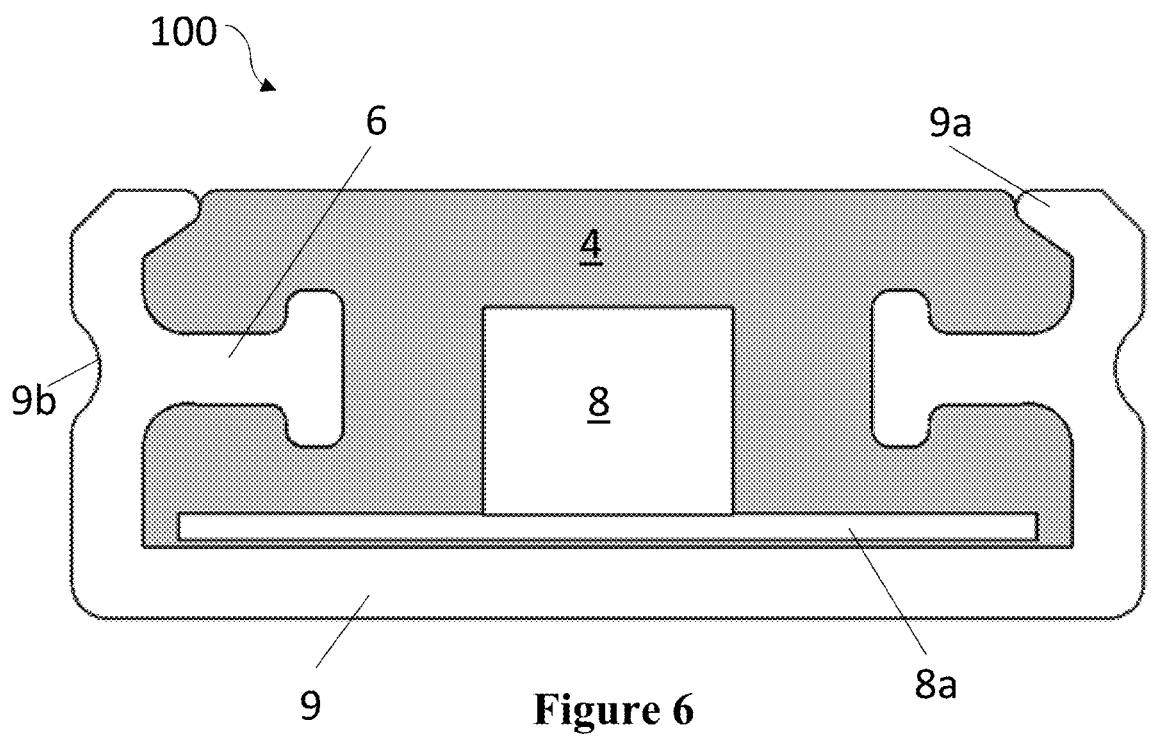
FIG. 6 is a cross-sectional view of a different flexible lighting strip.

The protrusions 6 of the embodiment being described each have a stem extending away from the sidewall and a cross-bar at least substantially perpendicular to the stem. A width of each protrusion 6 therefore increases away from the side wall, in a step-change between the stem and the cross-bar (potentially with curvature on the corner as shown in FIG. 6). It will be appreciated that, for clarity of description, the "width" of the protrusion 6 is parallel to the "height" of the channel 2 as described herein, and perpendicular to channel "width".

It will be appreciated that whilst the cross-bar of the "T" has the same thickness as the stem of the "T", the cross-bar provides a greater protrusion width due to its orientation.

Figure 9:
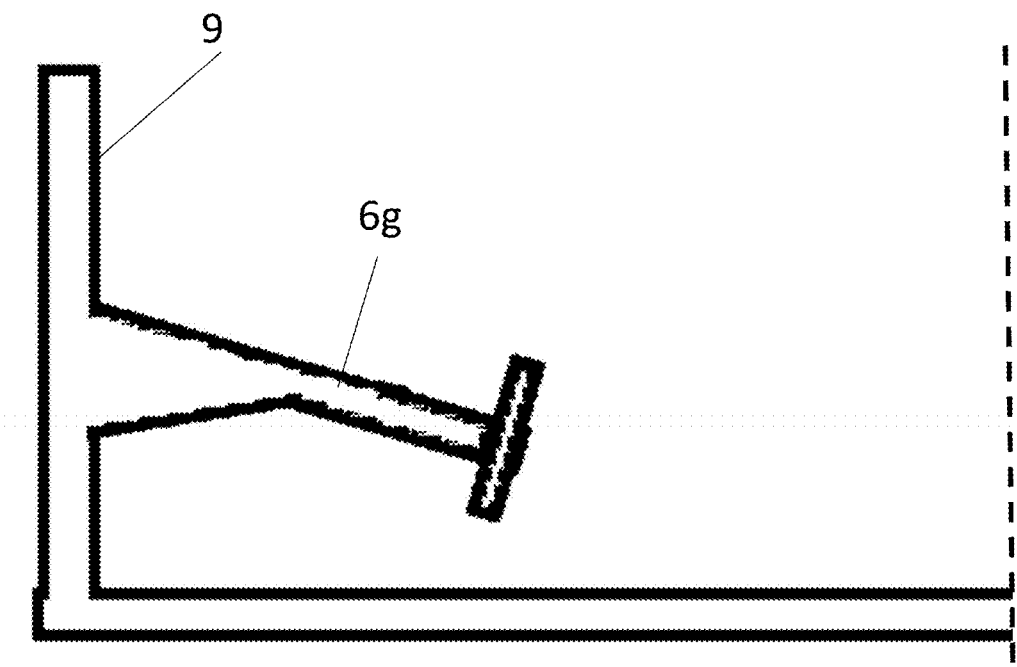
FIG. 9 is a cross-sectional view of a portion of a further different channel, with another different protrusion.

Each protrusion 6 has a first width where it leaves the sidewall—the width of the stem of the "T" in the embodiment shown in FIG. 1—and a larger second width within the channel 2—the extent/width of the cross-bar of the "T" in the embodiment shown in FIG. 1. The second width is greater than the first width by a factor of three in the embodiment shown in FIG. 1. In various other embodiments, the largest width of the protrusion 6 may be greater than the width where it leaves the sidewall 7 by at least a factor of two, and optionally by at least a factor of 3 or 4. In various other embodiments as described in more detail with respect to FIG. 9, the largest width of the protrusion 6 may not be greater than the width where it leaves the sidewall 7, but the protrusion 6 may narrow and then widen again as it extends into the channel 2 such that the protrusion still has a portion which widens as it extends further into the channel 2.

In the embodiment shown in FIG. 1, the second/largest width of each protrusion 6 is around 45% of the channel height. In other embodiments, the largest width of each protrusion 6 may be between 30% and 60% of the channel height.

In the embodiment shown in FIG. 1, each protrusion 6 extends into the channel 2 by around one sixth (approx. 17%) of the channel's width. In various embodiments, each protrusion 6 may extend into the channel 2 by at least 10% of the channel's width, and optionally by at least 15% or 20% of the channel's width. In various embodiments, the lighting components 8 may be arranged between the protrusions 6, such that the protrusions do not cover, and optionally do not overlap with, the lighting components 8. This may be particularly beneficial in embodiments in which the protrusions 6 are not made from a transparent (or highly translucent) material, so as to avoid blocking light.

The flexible lighting strip 100 further comprises an inner component 4. The inner component is arranged to fit within the channel 2—i.e. it is sized and shaped appropriately to allow it to fit within the channel 2, and a material of the inner component 4 is chosen to be compatible with the material of the track 9 (e.g. such that no unwanted chemical reactions may occur when they touch, whether or not oxygen or moisture is present). In the embodiment shown in FIG. 1, the inner component 4 is a separable insert designed to be a sliding fit within the channel 2—it is sized and shaped to fit closely within the channel 2, contacting the sidewalls 7 and base such that it cannot move freely relative to the channel 2 under gravity, but not being such a tight fit that it cannot be pushed along within the channel 2 (e.g. by hand). The insert 4 is therefore sized and shaped appropriately to allow it to be placed within the channel 2. In alternative examples with a separable insert 4, the insert 4 may be arranged to be inserted into the channel 2 from above, rather than being slid into the channel 2 from one end. It will be appreciated that protrusion design may be adapted to suit the intended method of insertion. The insert 4 may be formed by extrusion, molding, 3D-printing, machining, or any suitable fabrication technique known in the art.

In other embodiments, the channel 2 may be used to mold the inner component 4. For example, the track 9 may be packed with a potting material, which at least partially fills the channel 2. The potting material may then be allowed to set, or may be actively cured or otherwise hardened, to form the inner component 4. The inner component 4 may therefore be directly formed to fit within the channel 2.

For example, in such embodiments a potting material may be poured into the channel 2 within the track 9, over lighting components 8 therewithin (e.g. LEDs and circuitry), and left to set. The potting material may be selected to be transparent/nearly transparent, and to not change color significantly on setting. The inner component 4 may therefore comprise or consist of the lighting components 8 and the potting material, the potting material forming the bulk of the inner component 4 and having the lighting components 8 embedded therewithin.

The potting material, or more generally any material forming a body of the inner component 4, is selected to allow light through—it may be fully transparent, or may be translucent. In some embodiments, the material is selected to act as a diffuser, so helping to avoid individual spots of LEDs (or other lighting components 8) being visible.

In embodiments with a molded inner component 4 formed within the track 9, the protrusions 6 may vary in cross-sectional shape along the length of the track 9, and may even meet each other, or meet the opposing sidewall 7, in places.

Whether the inner component 4 is provided as a separate insert 4 for insertion into the track 9 or formed within the track 9, there may be no chemical bonding between the track 9 and the inner component 4, and no adhesive of any kind may be used—instead the protrusions 6 provide a locking arrangement to prevent the sides of the track 9 from buckling inward or outward when the flexible strip 100 is bent. The lack of bonding/adhesive may facilitate stress relief by small relative movements, and/or facilitate air release/avoid trapped gases, as described below.

The inner component 4 may therefore be formed separately as an insertable insert, or may be formed within the track 9. In embodiments in which the inner component 4 is formed within the track 9, it may still be separable thereafter, for example by sliding or pressing it out, and optionally back in (or into a different track 9). The material of the body of the inner component 4 may be described as a potting material whether the inner component 4 is made separately or within the track 9—it surrounds and protects any electrical circuitry/circuit boards and the lighting components.

In some embodiments, especially in embodiments in which the track 9 and inner component 4 are made from the same material, some chemical bonding between the two may exist. For example, an adhesive or local melting of one or both of the components 4, 9 may be used to bond the two together in one or more regions. This may improve sealing and/or mechanical robustness, but the limitation on relative movement may cause the minimum bend radius to be increased. To at least partially counteract any such limitation on bend radius, some scope for movement of the lighting components 8 relative to the track 9, and therefore relative to the inner component 4 if the track 9 and inner component 4 are held together more closely, may be provided. For example, one or more air gaps or voids may be provided between the lighting components 8 and the material forming the body of the inner component 4, allowing the lighting component 8 to move within that space. Additionally or alternatively, a soft potting material may be used in contact with the lighting components 8, allowing the lighting components 8 to push into/compress the potting material as the strip 100 is bent. In such embodiments, the inner component 4 may be provided with a harder "skin" or other casing, for example in the form of a thin layer surrounding the softer potting material, so as to allow the inner component 4 to retain its shape. That outer casing or "skin" may be bonded (chemically or otherwise) to the track 9, and more specifically within the channel 2 of the track 9.

In embodiments in which there are air gaps within the inner component 4, and/or in which the inner component 4 is bonded to the track 9, more air may be trapped within the lighting strip 100 than otherwise. One or more air vents, e.g. in the form of small holes or hollow tubes leading from the enclosed space to an outer edge of the lighting strip 100 may be provided to facilitate air escape on decompression in such embodiments, for example at each end of a track 9, and/or at intermediate locations. Suitable locations for air vents may be selected based on the shape and size of air gaps and bonding locations.

In the embodiments being described, the inner component 4 is at least substantially the same length as the track 9. In other embodiments, a series of shorter inner components 4 may be used within the same track section. Like the track 9, the inner component 4 has a significantly longer length than width or height, so may be described as elongate.

In various embodiments, the inner component 4 is sized to at least substantially fill the channel 2 in the track 9 and to be level with the top of the channel 2. The strip 100 as a whole may therefore be at least substantially rectangular in cross-section. In other embodiments, the sidewalls 7 may extend above the surface of the inner component 4, and/or the track 9 may have other extensions such as wings 10, providing a more complex cross-sectional shape.

The protrusions 6 are arranged to extend into the inner component 4. The protrusions 6 extend away from the respective sidewall 7 and into the inner component 4. The protrusions 6 are arranged to be at least substantially contained within the inner component 4 in use. The inner component 4 may have a corresponding recess or indentation 5 for each protrusion 6—in particular, the inner component 4 shown in FIGS. 1 and 4 has a pair of T-shaped recesses or channels 5, one on each side, extending along the length of the channel 2 and extending into the inner component 4. In embodiments with multiple discrete protrusions 6, e.g. in a series arranged along the channel, a series of corresponding indentations 5 may be provided accordingly.

In various embodiments, the second width (the widest width) of each protrusion 6 is at a point on the protrusion 6 within the inner component 4, such that the protrusions 6 increase in width within the inner component. The protrusions 6 may therefore hold the inner component 4 within the track 9 even when an external force is applied to deform the track 9, and may hold the sidewalls 7 of the channel 2 to the inner component 4, so reducing or avoiding splaying of the channel 2 in use.

Figure 3:
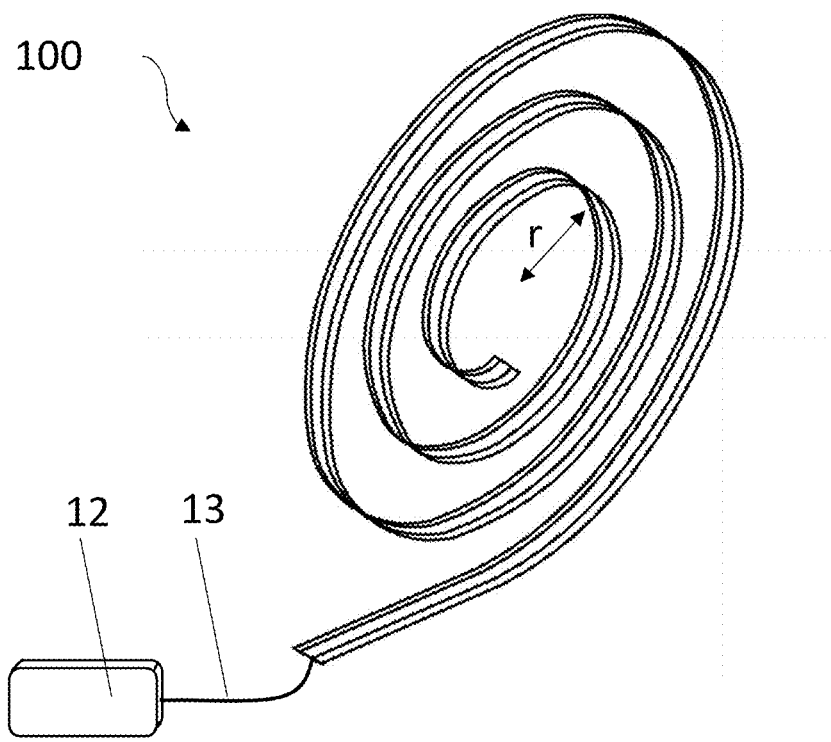
FIG. 3 illustrates a rolled flexible lighting strip.

The lighting strip 100 is described as flexible because it can be bent without the inner component 4 becoming separated from the track 9, and without any damage to the interface between the inner component 4 and the track 9. As shown in FIG. 3, the bend radius, r, is measured assuming that the strip 100 is rolled around an axis (Y) parallel to the width of the strip, and perpendicular to the extent of the side walls (strip height) and to the strip length.

Figure 11:
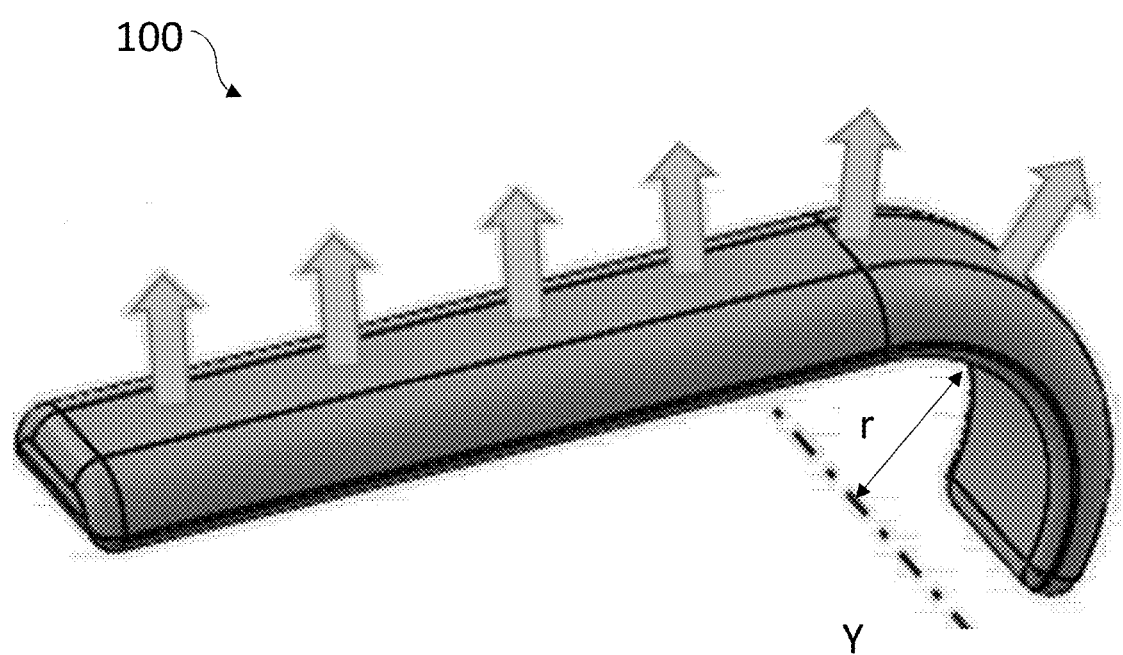
FIG. 11 shows a flexible lighting strip illustrating a bend radius, r, around an axis, Y.

More specifically, and as illustrated in FIG. 11, the bend radius, r, of the flexible lighting strip 100 may be different in each direction/orientation of the strip 100. For example, a minimum bend radius, r, around an axis, Y, may be at least substantially equal to 30 mm when the lights (e.g. LEDs) face outward as indicated by the arrows in FIG. 11 (the arrows representing light coming from the LEDs or other light source(s)). By contrast, the minimum bend radius in the opposite bend direction (i.e. with the LEDs/other light source(s) facing inwards) may be different, and in particular may be larger—for example being at least substantially equal to 50 mm. The minimum bend radius as described herein may generally be taken to be the smallest minimum bend radius around an axis, Y, perpendicular to the length of the strip 100 and parallel to the width of the strip 100, across all possible strip orientations around that axis, unless specified otherwise. The minimum bend radius as described herein may generally be the minimum bend radius with the light source(s) facing outwards/with a base of the track 100 closer to the axis than the protrusions are. It will be appreciated that, especially in implementations in which a photoluminescent material is used as the light source, the orientation of the light source per se is not a helpful definition, but rather it will be appreciated that the base may block light, whereas the upper surface of the track 100 is arranged to allow light out. The minimum bend radius as described herein may generally be the minimum bend radius with the base facing inwards.

In particular, the flexible lighting strip 100 can be bent to a radius of 40 mm, and optionally down to 30 mm, without the inner component 4 becoming separated from the track 9 and without the strip 100 being in any way damaged—it can be returned to its original shape with no ill effects provided that the minimum bend radius is respected.

By contrast, in earlier lighting strips, bending the strip to such a radius would cause the track to peel away from an insert/inner component, splaying at the edges and no longer protecting the insert, and not being able to return to its initial state on release/reshaping. Bonding between the inner component and track may also be permanently broken by bending in such previous products. In various embodiments described herein, no bonding is used between the inner component 4 and track 9. The connection using protrusions 6 allows some relative movement between the inner component 4 and track 9, so allowing stresses to be relieved without damaging the strip 100.

The inner component 4 comprises shaped channels or indentations 5 within it arranged to receive the protrusions 6. The channels or indentations 5 are shaped and sized to match the protrusions 6.

The inner component 4 comprises lighting components 8 arranged along the length of the inner component, and therefore along the length of the track 9 in use. In the embodiment being described, the lighting components 8 are electronically-controllable lights, and more specifically are light-emitting diodes (LEDs). In other embodiments, different electronically-controllable lighting elements 8 may be used, and/or a photoluminescent material may be provided as an additional or alternative lighting component 8. In embodiments with both electric lights 8 and a photoluminescent material 8, the electric lights may charge the photoluminescent material in normal operation, so ensuring that it is well-charged should the electric lights fail. When the lighting strip 100 is used to provide an accent to edges of a fixture or monument, the electrical lighting components 8 of the lighting strip 100 may have their desired aesthetic effect in normal lighting conditions, and the photoluminescent glow of the photoluminescent material 8 also contained within the inner component 4 may accent edges even when the power is off, or in a darkened cabin during a night-time flight for example, so passengers can see obstructions during an emergency escape event or whilst others are sleeping.

In some prior art lighting strips, for example for photoluminescent lighting, an inner component is entirely surrounded within a housing rather than being located in an open-topped channel 2 as described herein. Whilst sealing the top of the channel prevents splay of the side walls, this can lead to other problems in aircraft cabin installations. In particular, aircraft can suffer from sudden pressure loss at altitude, so any trapped air (or other gas) within a product such as a lighting strip can expand rapidly due to the pressure difference between inside and outside the product. This can be dangerous and lead to breakages of both the lighting strip and a fixture or surface it is attached to, potentially releasing projectile parts at high velocity in extreme cases depending upon the amount of trapped gas. Providing an open-topped channel minimises the amount of trapped air in the lighting strip 100. Similarly, having the protrusions 6 and indentations 5 instead of bonding between the track 9 and inner component 4 (or as well as some bonding, but with a reduced amount of bonding as compared to other lighting strips 100) may facilitate controlled air escape during decompression of the cabin, even if that decompression is rapid. With a completely enclosed flex housing in place of a track with a channel, there could be significant trapped air over the length of the lighting strip 100 (especially for LED lighting components, as compared to photoluminescent materials).

In various embodiments in which the flexible lighting strip 100 comprises electric lights 8, such as that shown in FIGS. 1 and 3, the flexible lighting strip 100 further comprises a central Command Unit (CCU) 12. In such embodiments, the CCU 12 is arranged to control the lighting components 8—for example to turn them on and off or to trigger a color change, and optionally also to provide power to them. In various embodiments, a relatively narrow track 9 is wanted for ease of fitting, so the CCU 12 is located outside of the track 9 and is connected to the lighting components 8 of the inner component 4 by one or more wires 13. The track cross-section may therefore be kept smaller and even along its length. For example, the track 9 may have a cross-section perpendicular to its length with a width of less than 4 cm and optionally less than 3 cm, and a height of less than 2 cm, and optionally less than 1 cm. For example, it may be around 25 mm by 8 mm, or around 18 mm by 5 mm or around 15 mm by 6 mm, or similar. The height may generally be less than its width, as pictured.

The material of the inner component 4 (and more specifically of the body of the inner component 4, excluding the lighting elements themselves) is selected to allow the passage of light therethrough so as to allow light from the lighting components 8 to be seen by an external viewer. The material of the inner component 4 may be at least substantially transparent in some embodiments, optionally allowing 90-100% of light to pass therethrough. In some embodiments, the material may be translucent, allowing light, but not detailed shapes, to pass through—the light may therefore be diffused to some extent by the material, which, advantageously in some implementations, may reduce spotting, disguising individual LEDs or other lighting elements. Different levels of light passage/transparency and diffusion may be provided by different materials, in different embodiments.

The inner component 4 comprises a potting material arranged to surround and encapsulate the lighting components 8 (and optionally any associated circuitry), so protecting them. In some embodiments, the inner component 4 consists of a potting material and the lighting components (and any associated circuitry) embedded therein. In other embodiments, the inner component 4 may comprise multiple different components; e.g. layers of different materials to provide a waterproof coating or other protective coating and/or a photoluminescent layer, or a reflective layer below the lighting components 8, or similar. In various embodiments, the lighting components 8 are LEDs, and the inner component may comprise an LED board 8a (as shown in FIG. 6) to which the LEDs 8 are connected, mounted in or on the potting material. In some embodiments, such as that shown in FIG. 6, the LED board 8a may be fully encapsulated within the potting material (except where one or more wires leave the track 9, e.g. for an electrical connection).

Alternatively, the LED board 8a may be mounted to an underside of the potting material, e.g. by means of an adhesive, and may be covered with a waterproofing layer or similar. In some such embodiments, the encapsulation of the lighting elements 8 within the potting material, coupled with the support provided from the track 9 once the strip 10 is assembled, may be sufficient to hold the LED board 8a in place, and no adhesive or other bonding may be used.

The lighting components 8 may therefore be fully enclosed within the inner component 4, and more specifically may be fully surrounded by a bulk material of the inner component 4.

The potting material 4 of various embodiments is a transparent or translucent, and aerospace-requirement compatible, potting material, such as a silicone or polyurethane material.

In the embodiment being described, the track 9 is made of an opaque material, such that light from the lighting components 8 only leaves the lighting strip 100 in the upward direction (in the orientation pictured). In other embodiments, a translucent or transparent material may be selected for at least part of the track 9, and light may therefore escape from the lighting strip 100 in other directions.

In the embodiment being described, the track 9 is made of a flexible (optionally elastic) polymer, and in particular of thermoplastic polyurethane— TPU. Other materials may be used in other embodiments. It will be appreciated that the use of protrusions 6 in place of bonding between the track 9 and inner component 4 may allow for greater flexibility in material selection, as an adhesive compatible with both materials is not needed, and some relative movement (e.g. due to differing expansion and contraction) may be accommodated (it will be appreciated that temperature and/or pressure variations in use in an aircraft cabin may cause materials to expand or contract). The inner component 4 is therefore not bonded to the track 9 in some embodiments.

Figure 2:
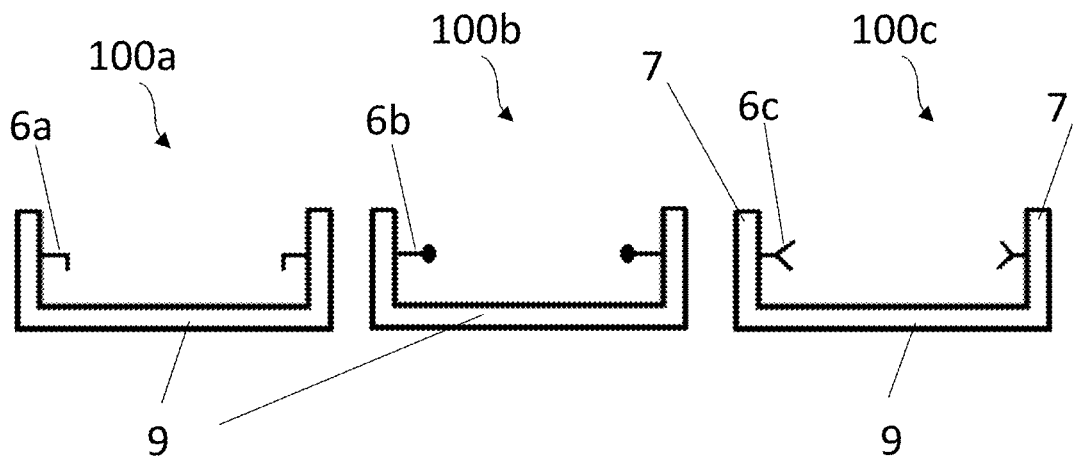
FIG. 2 provides cross-sectional views of three different flexible lighting strip channels.

FIG. 2 shows three alternative flexible lighting strip designs 100a, 100b, 100c. In these three embodiments, the track 9 is U-shaped in cross-section, with no wings or other extensions. These lighting strips 100a-c may be designed to be differently-located as compared to those with tracks 9 shown with "wings" 10 to cover a carpet, e.g. for mounting in or on an aircraft wall, partition, ceiling, or monument rather than on the floor. For example, the lighting strip 100a-c may be mounted onto an aircraft cabin fixture, e.g. a reclining seat, for example extending along an edge of the aircraft cabin fixture so as to mark the edge, or arranged around a specific feature to facilitate location or identification of that feature by a user.

In FIG. 2, the inner component 4 is not shown for clarity, but would be present in use.

These lighting strips 100a-c have protrusions different from the T-shaped protrusions 6 shown in FIG. 1 (it will be appreciated that a T-shaped protrusion is not limited to floor-path markings and is shown for that embodiment by way of example only, and that equivalently the protrusion types described with respect to FIG. 2 may be used with winged tracks 9 and/or for floorpath markings). In particular, the first example 100a of FIG. 2 has L-shaped protrusions 6a, the second example 100b has linear protrusions with a bulbous end 6b, and the third example 100c has Y-shaped protrusions 6c (all when viewed in cross-section).

In each case, the protrusions 6 have a constant cross-sectional shape and size along the full length of the track 9.

In each of the four examples pictured, the protrusions 6 have a stem extending from the sidewall 7, the stem being at least substantially perpendicular to the side wall. However, it will be appreciated that the stem could be differently angled in other embodiments; for example extending from the sidewall at an angle of 30° or 45° from the sidewall, as described below with respect to FIGS. 8A, 8B and 9.

In the first example 100a of FIG. 2, the L-shaped protrusions 6a have a downward bend, such that the part of the "L"

which is not the stem extends towards the channel's base. For the T-shaped protrusion 6 of FIG. 1 and the L-shaped protrusion 6a of FIG. 2, there is a step-change in width between the stem (first width) and the widest width—this may assist in locking the inner component 4 in a given position within the track 9, and any relative movement (other than in the direction along the length of the track 100) may require bending of the protrusion 6, 6a and/or deformation of the inner component 4.

In the second example 100b of FIG. 2, the bulbous ends of the protrusions 6b provide a curved shape, such that the width increases smoothly but rapidly from the stem to its widest width, instead of having a step change. An edge of the bulbous portion may therefore more easily pull within the channel within the inner component 4 for the stem, so providing a different option for a small amount of relative movement (e.g. on flexing the strip 100), whilst still limiting relative movement.

In the third example 100c of FIG. 2, the Y-shaped protrusions 6c provide a smooth, angled, increase in protrusion width from the stem to its widest width, instead of having a step change. An edge of the branched portion may therefore more easily pull within the channel within the inner component 4 for the stem, so again providing a different option for relative movement (e.g. on flexing the strip 100).

As shown in the third example 100c of FIG. 2, the protrusions 6 may branch in various embodiments. The width of the protrusion 6 may therefore be defined as extending from an uppermost point on any branch of the protrusion 6 to a lowermost point on any branch of the protrusion 6 at the same position across the channel 2. In addition, the width/thickness of the two or more branches individually may be selected such that a sum of their individual thicknesses is greater than the stem width, so reducing the chance of bending of the protrusion 6 allowing the sidewalls 7 to splay by preventing the branches from fitting within the part of the channel/indentation in the inner component 4 designed for the stem even if the branches were pulled or pressed together.

It will be appreciated that many different designs of protrusions 6 may be used without departing from the scope of the invention as claimed; for example, a P-shaped protrusion or an S-shaped protrusion may be used (this may be thought of as a curved version of the L-shaped protrusion described above).

In the various embodiments described the protrusions 6 are formed integrally with the rest of the track 9, optionally by extrusion. The track 9 may therefore be provided as a single piece. In alternative embodiments, the protrusions 6 may be made separately and then connected to the track 9. In various embodiments, the track 9 may be formed by extrusion, molding, 3D-printing, machining, or any suitable fabrication technique known in the art.

In the embodiments described above, the sidewalls 7 of the track 9 have a constant thickness (excluding the protrusions 6). In various other embodiments, however, wall thicknesses may vary—for example, sidewalls of the track 9 may be thinner above the protrusion 6 than below the protrusion, optionally by up to 50%. This thinning of the sidewalls 7 as they extend upwards may make the upper region more able to stretch or compress when the strip 100 is bent, rather than buckling in or out. As such, the shape of the strip 100 may be better maintained when bent to or towards its minimum bend radius.

In embodiments in which the protrusions 6 have a step-change in width from a first width to a second width (e.g. for L-shaped or T-shaped protrusions), the second width may be at least 1.5 times the first width. This step-change may help to prevent deformation of the protrusion or of the inner component allowing the cross-bar to be pulled through the inner component 4, so assisting in retaining the protrusion 6 in its intended location within the inner component 4.

Each protrusion 6 may have a maximum width of less than or equal to 50% of the height of the inner component 4 (noting that protrusion "width" is parallel to inner component "height"), so ensuring that the protrusion 6 remains fully within the inner component 4 at its widest point, and that the inner component is thick enough (and therefore strong enough) around the protrusion to reduce the risk of unwanted bending or deformation, which could allow unwanted or excessive relative movement. In embodiments in which the protrusion 6 branches, this maximum width (from uppermost to lowermost branch) may be greater than in non-branching embodiments, as material of the inner component between the branches may add to inner component strength. It will be appreciated that minimum material thicknesses etc. may be selected as appropriate for a given material and protrusion shape, bearing in mind a desire to avoid the protrusions drooping during a manufacturing process (e.g. an extrusion curing process) as well as a desired strength of the finished product. In some implementations, one or more removable webs or other features may be incorporated to support the protrusions 6 until the material is cured or otherwise hardened.

In the embodiments shown, each protrusion 6 extends from the track 9 at a position at least approximately central to an adjacent side of the inner component 4. In other embodiments, each protrusion 6 may be higher or lower rather than central, and a protrusion at one side may be higher than the protrusion at the other side (for example, if deemed appropriate for a particular intended mounting location/shape).

Due to the existence and shapes of the protrusions 6 and recesses 5, the inner component 4 of various embodiments can therefore be inserted into the track 9 from one end, and slid into place within the track 9, but cannot be pulled out vertically (without breaking the track 9). The inner component 4 is therefore securely held within the track 9 in use—the ends of the track 9 would generally be sealed or covered in use. In other embodiments, the shapes of the protrusions 6 and recesses 5 may be selected such that the inner component 4 may be removed vertically (e.g. "popped out") if the track 9 (and/or the protrusions 6) is deliberately deformed in a particular way—the shapes may or may not allow sliding insertion of the same inner component 4. In still other embodiments, the shapes of the protrusions 6 and recesses 5 may be selected such that the inner component 4 cannot be separated from the track 9 without breaking the track 9; for example with protrusion cross-section varying along the length of the track 9, and some protrusions 6/some portions of the protrusion optionally extending the full width of the track.

In the embodiments described above, the sidewalls 7 of the track 9 are straight and vertical—this may vary in other embodiments. For example, as shown in FIG. 6 the sidewalls may provide an overhang 9a in an upper region of the channel 2; having an upper portion which is angled inwards, towards the other sidewall. The inner component 4 may correspondingly have a narrower upper portion arranged to fit between and below the inwardly-directed portions 9a of the sidewalls of the track 9. This overhang 9a may assist in retaining the inner component 4 within the track 9 when the track 9 is bent or flexed—slight outward movement of the sidewalls would still leave at least a fraction of the inwardly-directed portions 9a of the sidewalls extending above a portion of the inner component 4.

In addition, in the embodiment shown in FIG. 6, the sidewalls 7 have a longitudinal indentation 9b on an external face of each sidewall, at a vertical position level with the protrusion from the inner face of the sidewall. These longitudinal indentations 9b may provide suitable features for the mounting of clip brackets or similar, without increasing the overall width or height of the track 9 (the top corner of the sidewalls 7 may also be chamfered as shown in FIG. 6, or otherwise shaped, as appropriate to accommodate a particular mounting clip design), so facilitating mounting of the lighting strip 100 in use. This shaping may additionally reduce the amount of material present, and hence the weight, without compromising strength as the protrusion 6 effectively provides a thickening of the side wall on its inner surface where the indentation thins the wall on its outer surface. The track 100 may therefore be relatively lightweight. For example, a lighting strip 100 as described herein may have a weight of less than or equal to 300 g or 250 g per meter of length, and optionally less than or equal to 200 g per meter of length (excluding power supply and cables between the strip 100 and the power supply). For example, the lighting strip 100 may have a weight per unit length of 170 g/meter.

The shaping may also facilitate manufacture in some embodiments, and/or may facilitate a small amount of outward flexion of the sidewalls at the level of the protrusion 6 without substantially deforming the track 9, so allowing for some stress relief on bending.

In FIG. 6, the inner component 4 has an LED board 8a arranged to provide power and/or control signals to the LED lighting elements/components 8 encapsulated within it, and extending along its length. The LED board 8a is therefore surrounded by, and held in place by, the same potting material which surrounds the lights 8.

In other embodiments, the inner component 4 may have an indentation along its base, so providing a channel in a lower surface of the inner component 4, parallel to the track length. An LED board 8a arranged to provide power and/or control signals to the LED lighting elements 8 may be seated within the channel of the inner component 4. In some embodiments, the LED board 8a may fill the channel in the inner component 4, so resting on the base of the channel 2 in the track 9. In other embodiments, the LED board 8a may be shallower than the channel in the inner component 4, and may be adhered to, or otherwise mounted on, the inner component 4 such that there is a gap between the LED board 8a and the base of the channel 2, with the inner component 4 touching the base of the channel 2 on either side of the LED board 8a. The LED board 8a may therefore be permanently mounted to the body of the inner component 4, and may be thought of as a part of the inner component 4.

Figure 7:
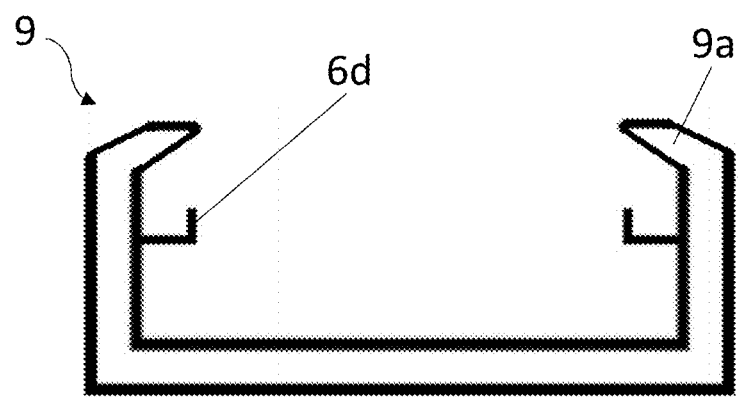
FIG. 7 is a cross-sectional view of a different flexible lighting strip channel.

In the embodiment shown in FIG. 7, the sidewalls 7 of the track 9 again have inwardly-directed portions 9a arranged to partially enclose the inner component 4, but do not have the indentations 9b described for the embodiment of FIG. 6. It will be appreciated that these features are separable. Likewise, different protrusion shapes may be selected for the same sidewall shape. In the embodiment shown in FIG. 7, the protrusions 6d are L-shaped like those 6a shown in the first example of FIG. 2, but whereas the L-shaped protrusions 6a have a downward bend, those 6d of the embodiment shown in FIG. 7 have an upward bend such that the part of the "L" which is not the stem extends towards the channel's opening. In embodiments with both an overhang 9a in the sidewalls 7 and an upward bend in the protrusion 6, an upper edge region of the inner component 4 may be effectively locked within a part of the track 9. Embodiments with an upward bend and no downward bend may be particularly suitable for embodiments in which an insert 4 is "popped in" to the channel 2 from above.

In the embodiments described above, the protrusions 6 extend from the sidewalls 7 at an angle of around 90°/at least substantially perpendicularly to the sidewalls. However, this may vary in other embodiments—either through a deliberate choice, or indeed through drooping or bending during a manufacturing process.

Figure 8A:
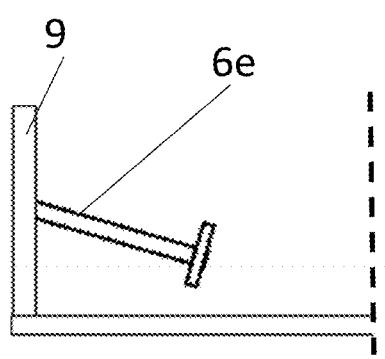
FIGS. 8A and 8B are cross-sectional views of portions of two different channels, with differing protrusions.

For example, and as illustrated in FIG. 8A, the protrusion 6e may bend downwardly from the same horizontal line along which it is connected to the sidewall 7 (so putting its cross-bar at an angle). This angle may vary along the length of the track 9. The height of an upper part of the protrusion 6 may therefore vary along the track 9, and the cross-bar (in examples with a cross-bar) may not necessarily be parallel to channel height.

In embodiments in which the inner component 4 is an insert 4 arranged to be inserted into the track 9, inserting the inner component 4 into the track may straighten the protrusion 6e in some embodiments, so making the cross-bar parallel to the height of the track again (for example). In other embodiments, indentations in the insert 4 to receive the protrusions 6 may be similarly angled (or indeed curved) and the bend, or droop, of the protrusion 6 from the sidewall 7 may be maintained.

In embodiments in which the inner component 4 is formed from a moldable material which is poured into the track 9 around the lighting components 8, the shape/position of the protrusions 6 may be at least substantially unaffected by the inner component 4—the track 9 may define the shape of the inner component 4, acting as a mold.

Figure 8B:
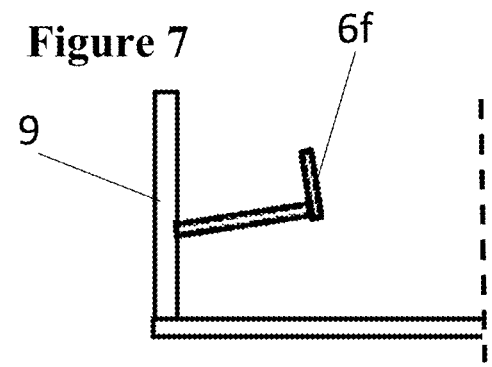

In some embodiments, such as that shown in FIG. 8B, an angle of the protrusion 6f as it extends away from a sidewall 7 may be deliberately selected for ease of inserting an insert 4. This protrusion 6f is L-shaped, with a cross-bar of the "L" pointing upwards, away from the base of the channel 2. The stem of the "L" extends away from the sidewall 7 with an upward inclination instead of being perpendicular to the sidewall. Such a track 9 may be used with an insert 4 that is designed to pop in from the top of the channel 2, i.e. to be inserted from above, bending the sidewalls 7 and/or the insert 4 a little to allow its insertion, rather than being slid in from one end of the track.

In the embodiments described above, the protrusions 6 are narrowest where they leave the sidewall 7, and widen within the inner component 4. In some embodiments, such as that shown in FIG. 9, the protrusion 6 may have a more complex variation in width, for example narrowing before it gets wider again, as it extends away from the sidewall 7. In the example shown, the protrusion 6g has an at least substantially triangular cross-section as it extends away from the sidewall 7, with a base of the triangle on the sidewall. The approximately triangular cross-section of the protrusion 6g then narrows to a bar within the inner component 4 rather than to a point, and then has a wider cross-bar at its innermost region, within the inner component 4. The cross-bar provides the greatest width of the protrusion 6g in the example shown. In other examples, the width of the protrusion where it leaves the sidewall 7 may be greater, but, importantly, the protrusion 6 still narrows before it gets wider again, so locking the inner component 4 to the track 9. The protrusion 6 may therefore decrease in width within the insert/inner component 4 before increasing in width again.

Whilst the thickness of the protrusion may therefore vary as the protrusion 6 extends into the inner component 4/the channel 2, in most embodiments the same cross-sectional shape of the track and protrusion is maintained (ignoring any bending/drooping as described above) along the full length of the track 9. This may facilitate manufacturing of the track 9 and protrusions 6 as a single piece by extrusion, and may allow for or facilitate the use of slidably-insertable inserts 4.

Figure 10:
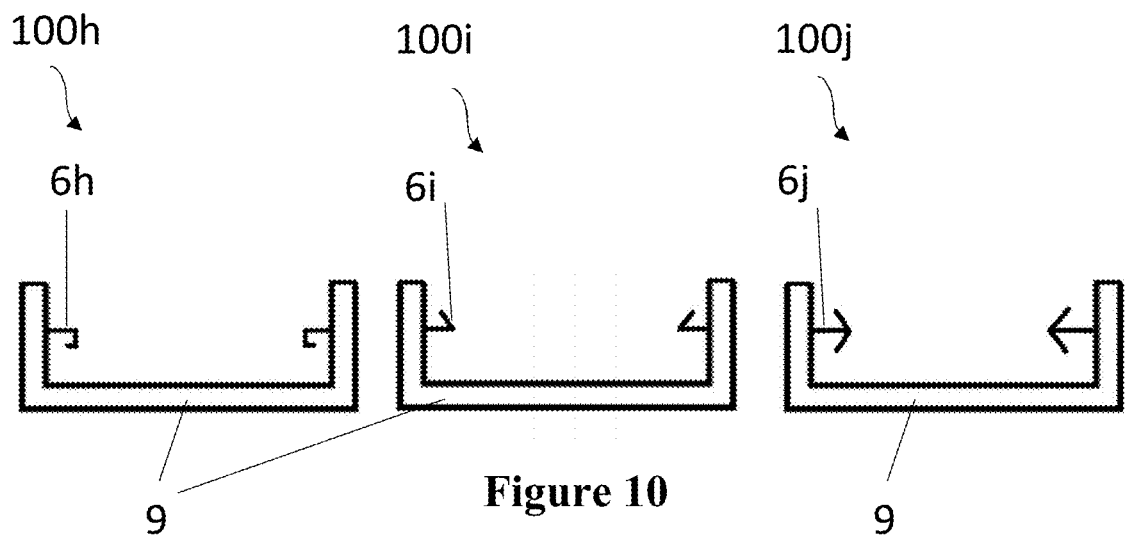
FIG. 10 provides cross-sectional views of three different flexible lighting strip channels.

In various embodiments, protrusions with sharp angles/bends, e.g. the 90° bends provided by the L-shaped or T-shaped protrusions 6, 6a, may be favored over more gentle slopes or curves, as the sharp angle may reduce the chance of gradual slippage, providing more resistance. In FIG. 10, three alternative flexible lighting strip designs 100h, 100i, 100j with more extreme angles in the protrusions are shown. In these three embodiments, the track 9 is U-shaped in cross-section, with no wings or other extensions—it will be appreciated that this is by way of example only, and that any track design may be used with any protrusion design.

In FIG. 10, the inner component 4 is not shown for clarity, but would be present in use.

These lighting strips 100h-j have protrusions different from the T-shaped protrusions 6 shown in FIG. 1. In particular, the first example 100h of FIG. 10 has a protrusion 6h comprising an L-shaped portion extending downwards and backwards from the initial stem, such that the protrusion 6h bends back on itself with two 90° bends, the second example 100i has a protrusion 6i which is approximately L-shaped but with an angle of less than 90° such that the cross-bar of the "L" is angled back towards the side wall of the track 9 instead of parallel to the track's height, and the third example 100j has is a protrusion 6j with an arrow-shaped head, the lines forming the arrow extending back towards the track wall—like a T-shaped projection but with the T's cross-bar bent (all protrusions shown and described when viewed in cross-section). The protrusions 6i-h effectively folding back on themselves may increase resistance to the track 9 sidewalls bowing outwardly, pulling away from the inner component 4.

In the first example 100h of FIG. 10, after extending away from the side wall of the track 9, the protrusion 6h has a 90° corner to a downwardly-extending vertical portion, and then a further 90° corner to a horizontal portion extending back towards the side wall to which the protrusion 6h extends. In other examples, the first 90° corner may be to an upwardly-extending vertical portion, and/or the corner angles may not be 90°.

In the second example 100i of FIG. 10, after the stem extending away from the side wall, the protrusion 6i has an acute-angled corner to a portion extending upwardly and back towards the side wall. In other examples, the corner may be to a downwardly-extending portion angled back towards the side wall of the track 9, and/or the corner angles may differ.

In the third example 100j of FIG. 10, after the stem extending away from the side wall, the protrusion 6j forks into two angled portions, each of the same width as the initial portion of the protrusion which extends away from the side wall (the stem). The angled portions extend back towards the side wall of the track 9, one being angled upwardly and the other downwardly. The two angled portions are symmetrical in the example shown, but may lack symmetry in other examples, for example being of different lengths, or at different angles to the initial, horizontal, portion of the protrusion. The corner angles may also differ between examples.

In these three examples 100i-h, the initial portion of the protrusion 6i-h (the stem) extending away from the side wall of the track 9 is horizontal—it will be appreciated that this stem may be differently angled in other examples (e.g. extending downwardly at an angle into the insert 4).

In the embodiments described above, the protrusions 6 and sidewalls 7 of a given track 9 are symmetrical/the same on each side. However, in other embodiments, sidewall shape and/or protrusion shape may differ on one side of the track 9 as compared to the other.

In embodiments in which the inner component 4 is made from a moldable material (a potting material) which is set, cured, or otherwise hardened in situ within the track 9, the flexible lighting strip 100 may be generally assembled by a manufacturer and provided to an installer as a single unit. However, it will be appreciated that the track 9, potting material, and instructions may be provided to an installer in other implementations.

In some embodiments in which the inner component 4 is an insert 4, the track 9 and insert 4 may be assembled by a manufacturer to form the lighting strip 100. In other such embodiments, the parts 9, 4 may be provided separately to be assembled by an installer. This may be beneficial in scenarios in which different inserts 4 may be used with the same track 9, or in which multiple track sections and multiple insert sections are to be used, and it is desired to have the starts and ends of the sections offset such that a join between sections of the track is at a different position from a join between sections of the insert, for example.

Figure 4:
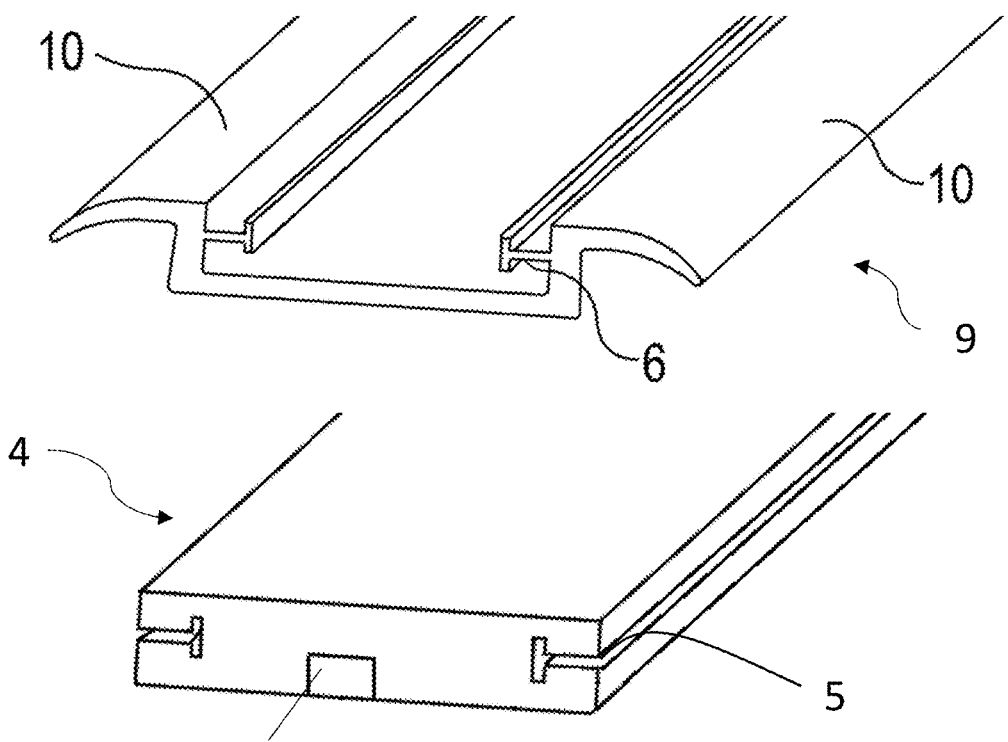
FIG. 4 illustrates separated components of the flexible lighting strip of FIG. 1.

A kit of parts for forming a flexible lighting strip 100 as described herein may therefore be provided, as illustrated in FIG. 4. The kit of parts comprises at least one track 9 and at least one insert 4. Sets of different inserts 4 and/or of different tracks 9 may be provided in the kit of parts to allow a user to select a combination as desired. In a given kit of parts, all protrusions 6 (and corresponding indentations in the insert 4) may be the same such that any track 9 can be used with any insert 4 of the kit of parts. The kit of parts may further comprise one or more central Command Units (CCUs) 12 connected, or connectable, to an insert 4.

As described above, the or each track 9 of the kit of parts comprises a channel 2 extending along the length of the track 9 and two inwardly-directed protrusions 6 extending along opposing sides of the channel 2. Each of the protrusions 6 extends into the channel 2 from a side of the channel, and thereby into the insert 4 in use, once the insert has been located within the channel 2. Each protrusion 6 widens within the channel 2, and therefore widens within the insert 4 in use.

The kit of parts further comprises at least one elongate insert 4. The or each insert 4 comprises lighting components 8 arranged along the length of the insert 4 and two inwardly-directed indentations 5 extending along opposing sides of the insert. The insert 4 is sized and shaped to be insertable, optionally slidably insertable, into the channel 2 of the track 9, the indentations being sized and shaped to receive the protrusions 6 of the track 9 therein. As each protrusion 6 widens within the insert 4, the sides of the channel 2 are held to the insert 4, reducing or avoiding outward splay of the channel walls when the lighting strip 100 is bent.

In some embodiments, such as that described with respect to FIG. 1 above, the flexible lighting strip 100 may be used for aircraft floor-path marking. The flexible lighting strip 100 can be provided in a roll, as is illustrated in FIG. 3. The roll 100 may be used to lay a continuous strip of the aircraft floor-path marking along the aisle of the aircraft. In use, the or each roll 100 can be unrolled in place in the aircraft and the marker system fitted to the floor of the aircraft. The track 9 may be unrolled along an aisle of an aircraft and cut to an exact size with no joints, or few joints. The inner component 4 may be inserted into the track 9 after fitting the track to the aircraft cabin floor in some embodiments, but more generally may be inserted into the track 9 prior to installation, or indeed formed within the track 9. It is envisaged that the unrolled length of the flexible lighting strip 100 may be at least as long as an aisle of an aircraft, so reducing the need for joins.

Figure 5:
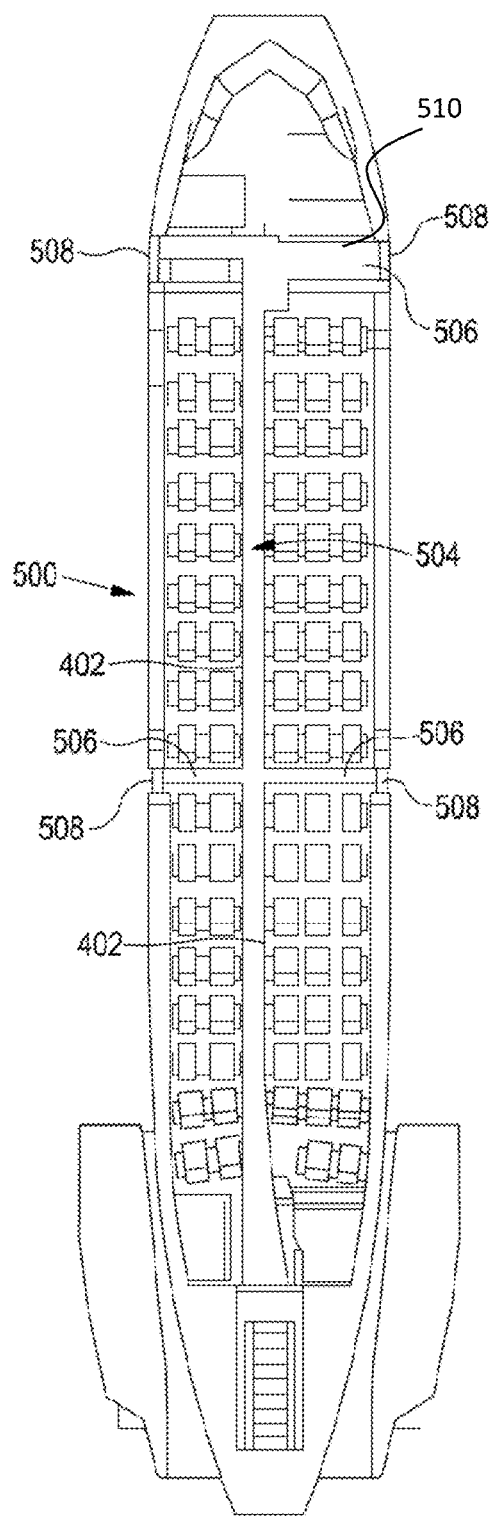
FIG. 5 is a schematic representation of an aircraft cabin comprising one or more flexible lighting strips as described herein.

It is envisaged that a roll of the flexible strip 100 can be used in an aircraft cabin 500 as a floor-path marking system 402 as illustrated in FIG. 5. An installer may unroll the flexible strip 100 and lay it in place along the aisles 504 of the aircraft. The lighting strip 100 can also be laid along spurs 506 such as to the emergency exit doors 508 or through the galley sections 510, and the sections of lighting strip 100 can be jointed to one another. The flexible nature of the marker system is such that the marker system can be stored on a roll and can be unrolled onto an aircraft floor. By contrast, prior art floor path marking systems are typically supplied in rigid or semi-rigid lengths of around 2 m (6 ft). A fitting mechanic is required to install the lengths of such systems and to cut lengths to size as required. It will be appreciated that a joint has to be provided between each length and an adjoining length. Each joint is a point of weakness in which water and dirt can enter the floor-path marking system and cause additional wear. There is additionally a significant expenditure of time and effort in laying the system with a large number of joints. It will be appreciated that flexible lighting strips 100 of the kind described herein may therefore facilitate installation and maintenance of the floor-path marker system, to the advantage of the airlines using the marker system.

Further, the same principles apply to other installation locations—flexible lighting strips 100 may be installed along an edge of over-head lockers, seats, and/or tables, or along ceilings or walls, for example. It will be appreciated that floor-path marking is described above by way of example only, and is not intended to be limiting.

What is claimed is:

1. A flexible lighting strip for use in an aircraft cabin, the flexible lighting strip having a minimum bend radius of no more than 40 mm, and comprising:
   a flexible track comprising a channel extending along the length of the track, the track extending along at least substantially all of the length of the flexible lighting strip; and
   a flexible inner component within the channel, the inner component comprising lighting components arranged along the length of the inner component, wherein an upper face of the inner component is at least substantially exposed, and lower and side faces of the inner component are at least substantially contained within the track;
   wherein the track comprises two inwardly-directed protrusions extending from opposing sides of the channel, each of the protrusions extending into the inner component and increasing in width within the inner component, the protrusions being arranged to hold the inner component within the track even when the track is deformed, holding sidewalls of the channel to the inner component so as to reduce splaying of the channel.

2. The flexible lighting strip of claim 1, wherein the flexible lighting strip has a minimum bend radius of a maximum of 30 mm.

3. The flexible lighting strip of claim 1, wherein the lighting components comprise light-emitting diodes.

4. The flexible lighting strip of claim 1, wherein the inner component is at least substantially the same length as the track.

5. The flexible lighting strip of claim 1, wherein each protrusion extends into the channel by at least 10% of the channel's width.

6. The flexible lighting strip of claim 1, wherein each protrusion has a first width where it enters the inner component and a largest width within the inner component, the largest width being greater than the first width by at least a factor of two.

7. The flexible lighting strip of claim 1, wherein the channel is at least substantially U-shaped in cross-section, having two sidewalls and one of the protrusions extending from each sidewall.

8. The flexible lighting strip of claim 1, wherein the lighting components are fully enclosed within the inner component.

9. The flexible lighting strip of claim 8, wherein the inner component comprises a potting material arranged to surround and encapsulate the lighting components.

10. The flexible lighting strip of claim 1, wherein the flexible lighting strip has a cross-section perpendicular to its length with a width of less than 4 cm and a height of less than 2 cm.

11. The flexible lighting strip of claim 1, wherein the protrusions extend along opposing sides of the channel, and have a constant cross-sectional area and shape along the full length of the track.

12. The flexible lighting strip of claim 1, wherein the protrusions are formed integrally with the rest of the track.

13. The flexible lighting strip of claim 1, wherein the inner component is a slidably-insertable insert adapted to be positioned within the track by insertion from one end thereof.

14. The flexible lighting strip of claim 1, wherein the inner component is formed by at least partially filling the track with a potting material, and then curing or otherwise setting the potting material within the track.

15. The flexible lighting strip of claim 1, wherein the lighting components are electrically controllable and the flexible lighting strip further comprises a central Command Unit (CCU) arranged to control the lighting components, and wherein the CCU is located outside of the track and is connected to the lighting components of the inner component by one or more wires.

16. The flexible lighting strip of claim 1, wherein the inner component is not bonded to the track.

17. The flexible lighting strip of claim 1, wherein the protrusions have a step-change in width from a first width to a second width at least 1.5 times the first width.

18. An aircraft cabin fixture comprising a flexible lighting strip as described in claim 1, the flexible lighting strip extending along an edge of the aircraft cabin fixture.

19. A flexible lighting strip for use in an aircraft cabin, the flexible lighting strip having a minimum bend radius of no more than 40 mm, and comprising:
   a track comprising a channel extending along the length of the track; and
   an inner component within the channel, the inner component comprising lighting components arranged along the length of the inner component;

wherein the track comprises two inwardly-directed protrusions extending from opposing sides of the channel, each of the protrusions extending into the inner component, increasing in width within the inner component, and having a cross-section selected from the group consisting of:
(i) T-shaped,
(ii) L-shaped, and
(iii) Y-shaped.

20. A kit of parts for forming a flexible lighting strip, the kit of parts comprising:
a flexible track comprising a channel extending along the length of the track and two inwardly-directed protrusions extending along opposing sides of the channel, each of the protrusions extending into the channel and widening within the channel; and
an elongate, flexible insert, the insert comprising lighting components arranged along the length of the insert and two inwardly-directed indentations extending along opposing sides of the insert, wherein an upper face of the inner component is at least substantially exposed, and lower and side faces of the inner component are at least substantially contained within the track;
wherein the insert is insertable into the channel of the track, the indentations being sized and shaped to receive the protrusions of the track therein, the protrusions being arranged to hold the inner component within the track even when the track is deformed, holding sidewalls of the channel to the inner component so as to reduce splaying of the channel.

* * * * *